United States Patent [19]
Barea

[11] Patent Number: 5,838,570
[45] Date of Patent: Nov. 17, 1998

[54] DEVICE FOR MONITORING THE FEED OF A PLURALITY OF YARNS TO A TEXTILE MACHINE HAVING ENCODED SENSOR MEANS, AND A METHOD FOR ITS CONTROL

[75] Inventor: Tiziano Barea, Busto Arsizio, Italy

[73] Assignee: B.T.S.R. International S.p.A., Olgiate Olona, Italy

[21] Appl. No.: 675,433

[22] Filed: Jun. 27, 1996

[30] Foreign Application Priority Data

Jul. 3, 1995 [IT] Italy .................................. MI95A1420

[51] Int. Cl.$^6$ ...................................................... G06F 15/46
[52] U.S. Cl. ............................... 364/470.14; 364/470.01; 364/470.11; 364/138
[58] Field of Search ............................. 364/470.01, 550, 364/470.14, 470.11, 138; 139/452

[56] References Cited

U.S. PATENT DOCUMENTS

| | | | |
|---|---|---|---|
| 4,140,898 | 2/1979 | Gasser et al. | 73/160 |
| 5,225,988 | 7/1993 | Barea | 364/470.01 |
| 5,323,324 | 6/1994 | Fredriksson | 364/470.01 |
| 5,331,564 | 7/1994 | Barea | 364/470.14 |

FOREIGN PATENT DOCUMENTS

| | | |
|---|---|---|
| 0452800 | 10/1991 | European Pat. Off. . |
| 0465911 | 1/1992 | European Pat. Off. . |
| 4216242 | 11/1993 | Germany . |
| 9009474 | 8/1990 | WIPO . |
| 9009625 | 8/1990 | WIPO . |
| 9203881 | 3/1992 | WIPO . |

OTHER PUBLICATIONS

Patent Abstracts of Japan, vol. 7, No. 290 (P–245), Dec. 24, 1983 & JP–58 163013, Sep. 27, 1983.

*Primary Examiner*—John E. Barlow, Jr.
*Assistant Examiner*—Hien Vo
*Attorney, Agent, or Firm*—Steinberg & Raskin, P.C.

[57] ABSTRACT

A device for monitoring the feed of a plurality of yarns (2) to a textile machine (1) comprises a number of sensor means (4) equal to the number of yarns (2) and each cooperating with a corresponding yarn (2) of which they sense the state of feed, and being connected to a control unit (5) which, on the basis of the signals generated by the sensors and of a reference signal ($V_A$) which is a function of the operating position of the machine (1), enables this latter to be activated or not. The sensors (4) are connected to the unit via a number of connection members less than the number of sensors, each sensor being provided with its own identification code. The device is controlled by the control unit (5) which sequentially interrogates the various sensors (4) by feeding them their own identification code, only that sensor (4) which recognizes this code then feeding to the unit the data relative to the state of the yarn (2) monitored by it.

19 Claims, 2 Drawing Sheets

DEVICE FOR MONITORING THE FEED OF A PLURALITY OF YARNS TO A TEXTILE MACHINE HAVING ENCODED SENSOR MEANS, AND A METHOD FOR ITS CONTROL

FIELD OF THE INVENTION

This invention relates to a device in accordance with the introduction to the main claim. The invention also relates to a method for its control.

BACKGROUND OF THE INVENTION

Various devices and methods using these latter are known for monitoring yarns fed to textile machines in general and in particular to hosiery and knitting machines. For example, European patents EP-0452800 and EP-0465911 relate to devices able, during the production of an article or a working master, to self-learn by means of suitable electronic sensors the entire yarn pick-up sequence of the textile machine and to then compare the memorized self-learnt sequence with that sensed (by the same sensors) during normal production, to halt the textile machine if a yarn pick-up anomaly should occur in this latter.

Other devices forming part of the textile machine are also known which, my means of suitable programming, are able to know in advance what the yarn pick-up sequence should be, to hence compare the memorized sequence with the actual pick-up sequence of the textile machine, again by means of the yarn monitoring sensors.

From the aforegoing it is apparent that the essential elements of the known devices include the monitoring sensors for the yarn fed to the textile machine. These sensors cooperate with all the yarns which the machine is required to use during its working cycle, and consequently as for each yarn there is a corresponding sensor, the number of these increases with the number of said yarns. As each sensor is necessarily connected to a control unit which controls the operation of the textile machine (either external or internal to this latter) and as such a connection is made via a corresponding electric cable, it is apparent that as the number of yarns and sensors increases so does the number of said electric cables, with the consequent need to group said cables in a single bundle to prevent them coming into accidental contact with the yarn and to give a necessary order and tidiness to the textile machine structure. In addition, the fact of having a number of electric cables equal to the number of sensors can give rise to technical problems on mounting and during possible maintenance. Although these problems may be small if the textile machine operates with just a few yarns (for example a hosiery machine, which usually uses from sixteen to thirtysix yarns), they become important in the case of a knitting machine (using on an average from thirtysix to threehundred yarns) or a large warping machine (which usually operates on more than one thousand yarns). These problems are additional to the mounting and assembly times and costs, which in the case of the latter two machines considerably affects their purchasing and maintenance costs.

WO-90/09474 relates to an arrangement for controlling and/or monitoring, with the aid of a computerized system, a number of elements/functions forming part of a textile machines. For each element/function the system has one or more units which serve the element/function and which together with other units form a network in the system. For example, one function to be controlled and monitored in a weaving machine is the tension in the yarn during the weaving process.

According to the prior art, in a textile machine, such as a weaving machine where a plurality of units are involved and where a computerised system is used to control them (and hence the operation of the textile machine), there are a several requirements such as: an accurate, reliable and rapid transmission of information between the different units and the control unit of said system; suitable synchronization of a sequence of events for each transmission that can be sent from or to all units concerned; a suitable connection between the control unit and each of the units in the machine suitable for errabling the control unit to reach the different pieces of information at physical boundaries or interfaces; a simple machine with simple wiring. The aim of WO90/09474 is offering a way to meet one or more of the preceding requirements. According to the prior art, each unit is connected (or connectable) to a connection which forms part of the network and in which message transmission within the computerised system takes place. Each unit controls and/or monitors the yarn feeding (and its particular features such as yarn tension, shifts in the spool/yarn-feed element, etc.) and comprise one or more micro-computers. According to the present invention, in the network system messages can be transferred between the different units (and therefore between the control unit and those controlling yarn feeding) by ranking said messages from the point of view of priority, i.e. different types of messages are transmitted with different priority. Due to this fact, time-critical messages from some units are not hindered by other less important messages from other units.

Furthermore, according to the prior art, a digital communication protocol with standardized mechanical and electrical features can be used in order to allow connection of any unit with any other one. Each unit is assigned an identification number in the system; the allocation can take place by means of a code being received in the terminal contact of its micro-computer.

The preceding prior art relates to an arrangement which comprises a serial connection between its different units, each of them sending its message to the network according to the above-cited priorization. This prevents collision between simultaneous transmissions from the units. Consequently, in the prior art each unit plays an active role in the computerized system by sending its messages to the control unit and to any other unit of said system. This means that the serial connection must always have at least two wires, i.e. one for sending the message form each unit and one for allowing the latter to receive any message form any other unit. This means that in the prior art the wiring connection in the textile machine is simplified but also that are always at least two wires connecting each unit with the connection which forms part of the network.

Moreover, in the solution suggested in the prior art any unit transmits its message at any time during the operation of the textile machine. According to the priorisation procedure, this message is received by the control unit, with the result that in the prior art the latter does not control all the units in sequence. Due to this, and to the above cited particular procedure of transmission/reception of the message in the network, if a plurality of messages has the same priority and these messages are trasmitted substantially at the same time, the next message can be received only when the former message ends (and is completely received by the unit in the network, such as the control unit). Due to this, the prior art cannot be used on textile machines where a large number of yarn control units is involved, i.e. warping and large diameter knitting machines.

WO92/03881 describes a distributed computer system working in real time and comprising parallel-connectin multiprocessor, and master and slave units communicating with each other via a serial bus connection. The slave units can be connected to the bus connection by means of connecting devices, i.e. interfaces.

This known solution a very complicated system requiring interfaces so that the slave units may be connected to the serial bus connection. In this way devices already available on the market (the slave units) and may be used connected to said bus connection, but this known system has a further drawback: long assembling time.

OBJECTS AND SUMMARY OF THE INVENTION

The present invention seeks instead to provide an roved device for monitoring the feeding of a plurality of yarns to a textile machine having encoded sensor means and the method for its control.

In particular, an object of the present invention is to provide a device for monitoring the yarn feed to a textile machine and for controlling the device itself which obviate the drawbacks of analogous known devices.

Another object of the invention is to provide a device of the stated type which is of simple assembly, which can be easily and quickly mounted on the textile machine and for which the maintenance can be carried out within a short time, with consequent limitation on assembly and maintenance costs.

A further object is to provide a device of the stated type which results in an ordered and tidy appearance for the textile machine on which it is mounted.

A further object is to provide a method for controlling the said device which results in excellent and reliable control of the textile machine.

These and further objects which will be apparent to the expert of the art are attained by a device in accordance with the corresponding accompanying claims.

Said objects are further attained by a method for controlling said device in accordance with the corresponding accompanying claims.

In the present device, the control unit operates a sequential interrogation of the sensor means associated with the yarns fed to the textile machine which substantially play a passive role during the communication with said unit. The sequential interrogation is made on the basis of a reference signal which is a function of the operating position of the textile machine.

Therefore, when said reference signal is received by the control unit, it interrogates all the sensor means. In this way at every interrogation corresponding to every operational position of the textile machine (and therefore to every stage of manufacturing of the product) said unit knows the data relating to the state of feed of the yarn monitored by each sensor and can decide how to operate on the textile machine so that it may quickly stop it when a n incorrect datum is monitored by any one of said sensors).

The sensor means do not transmit any message towards the control unit autonomously and therefore there is no need for a priorisation procedure in the transmitted messages. Hence, all the messages from the various sensor means are always transmitted to the control unit in the same order or sequence. This allows thid system to be simpler than the known systems an d to operate on the textile machine in a quicker way than known systems do. Due to this fact, the invention needs only one, or at most two wires to connect the control unit to any of the sensor means.

Furthermore, the control unit operates a serial connection with the sensor means after receiving the reference signal; this interrogation occurs in a very short time. Therefore, after doing this and until another reference signal is received, the control unit can process the data received and hence take all the necessary decisions for operating on the textile machine.

Moreover, in the present invention the identification code is assigned to any of the sensor means directly by the control unit (automatically or by pressing a suitable acceptance key by an operator). This prevents two different sensors from having the same code.

BRIEF DESCRIPTION OF THE DRAWINGS

The present invention will be more apparent from the accompanying drawing, which is provided by way of non-limiting example and in which.

DETAILED DESCRIPTION OF THE INVENTION

Figure 1:
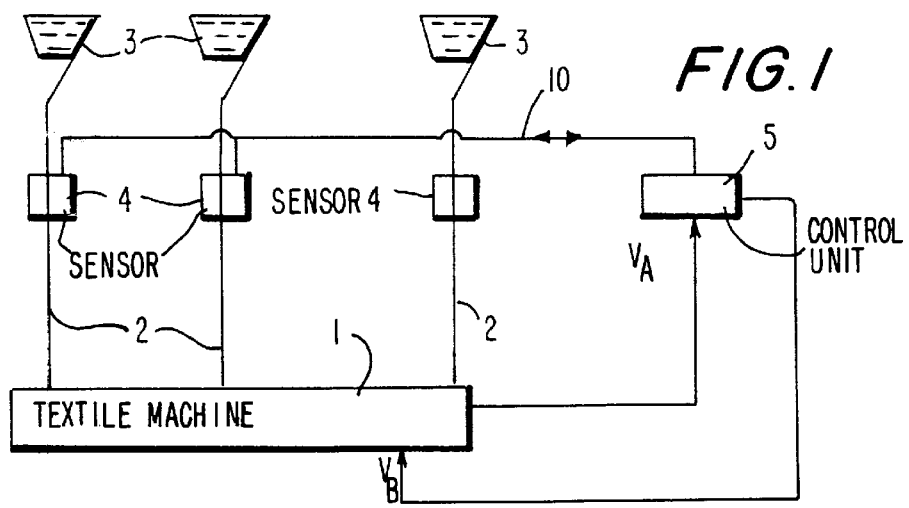
FIG. 1 is a schematic view of a textile machine provided with the device according to the invention.

With reference to said figures, a textile machine 1 (such as a knitting or hosiery machine) is fed with a plurality of yarns 2 unwinding from respective bobbins 3. Each yarn cooperates with its own sensor 4 which in known manner determines whether it is moving or at rest, and/or its tension, and/or its speed of advancement towards the machine 1. The sensors 4 are connected to a control unit 5 (internal or external to said machine), for example a microprocessor such a microcontroller single chip, which receives a synchronism signal $V_A$ from the machine 1 and generates, on the basis of a predefined control algorithm for the signals generated by the sensor 4 relative to the state of each yarn 2 and for the signal $V_A$, a halt signal $V_B$ for the machine 1 should one of these yarns be in an undesired state (for example be at rest instead of in movement, or have an excessive speed of movement). Said signal $V_A$ is representative of the working position reached by the machine 1 (for example one or more predetermined angular positions of a rotating cylinder of a circular machine). This control algorithm is memorized by the unit 5 in known manner; for example it is defined in accordance with the known self-learning method or by suitable programming. The synchronism signal $V_A$ is generated for example by a usual sensor element (such as an inductive proximity sensor, Hall effect sensor or other known sensor) positioned in correspondence with a moving part of said machine 1, such as its usual transmission shaft. Alternatively, this signal can be generated in known manner by a usual electronic control circuit. This signal enables the unit 5 to know the working point reached by the machine 1, its speed or its possible stoppage. According to the invention, the sensors 4 are connected to the control unit 5 by one or more feed cables 10 providing communication with this latter, the number of such cables being less than the number of sensors 4. The cable or cables or lines 10 define lines of serial communication with the unit 5 to which the lines are connected via a corresponding number of its serial ports (not shown).

By virtue of the type of serial connection between the unit 5 and the sensors 4, the number of electrical connections between these latter and said unit is small. This number can even be reduced to one (a single serial cable, as in FIG. 1) if the number of yarns fed to the textile machine (and hence to the sensors) is not excessive (for example is less than thirtysix).

Figure 2:
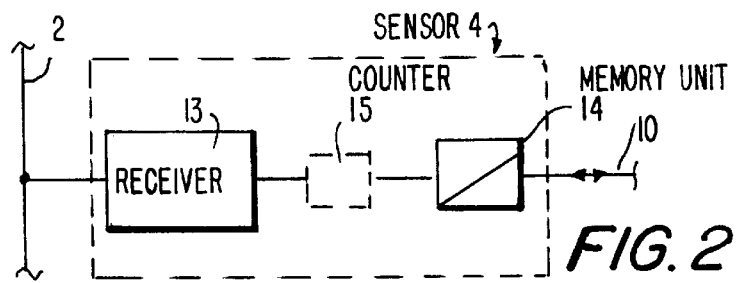
FIG. 2 is a schematic view of a sensor of the device according to the invention.

This type of connection is achievable mainly by virtue of the type of sensors 4, which each comprise (see FIG. 2) a receiver portion 13 of known type in direct contact with the corresponding yarn 2, and at least one memory unit 14 or an equivalent member such as a flip-flop. Between said portion 13 and the unit 14 there can be inserted a usual counter member 15 able to measure how much time a certain event lasts, for example the movement of the yarn 2. The unit 14 is connected to the unit 5 via the aforesaid serial connection 10.

The said type of sensor enables the unit 5 to securely and reliably control the machine 1 during the production or working of an article. This is achieved by the method for controlling the device according to the invention (comprising the particular described sensors 4 and the particular serial connection by which these are connected to the unit 5), which is described herein after.

Figure 4:
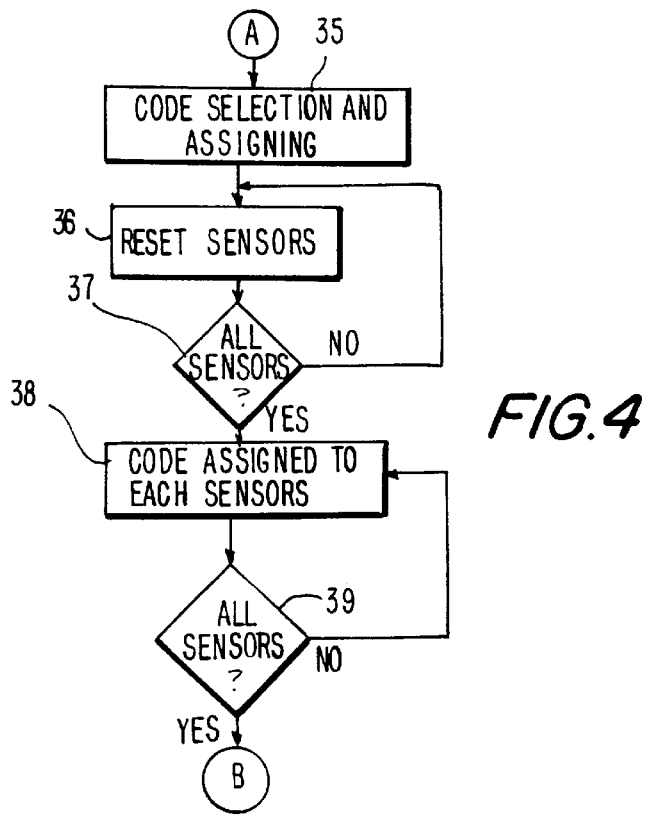
FIG. 4 is a block scheme of a particular step of the method according to the invention.
Figure 3:
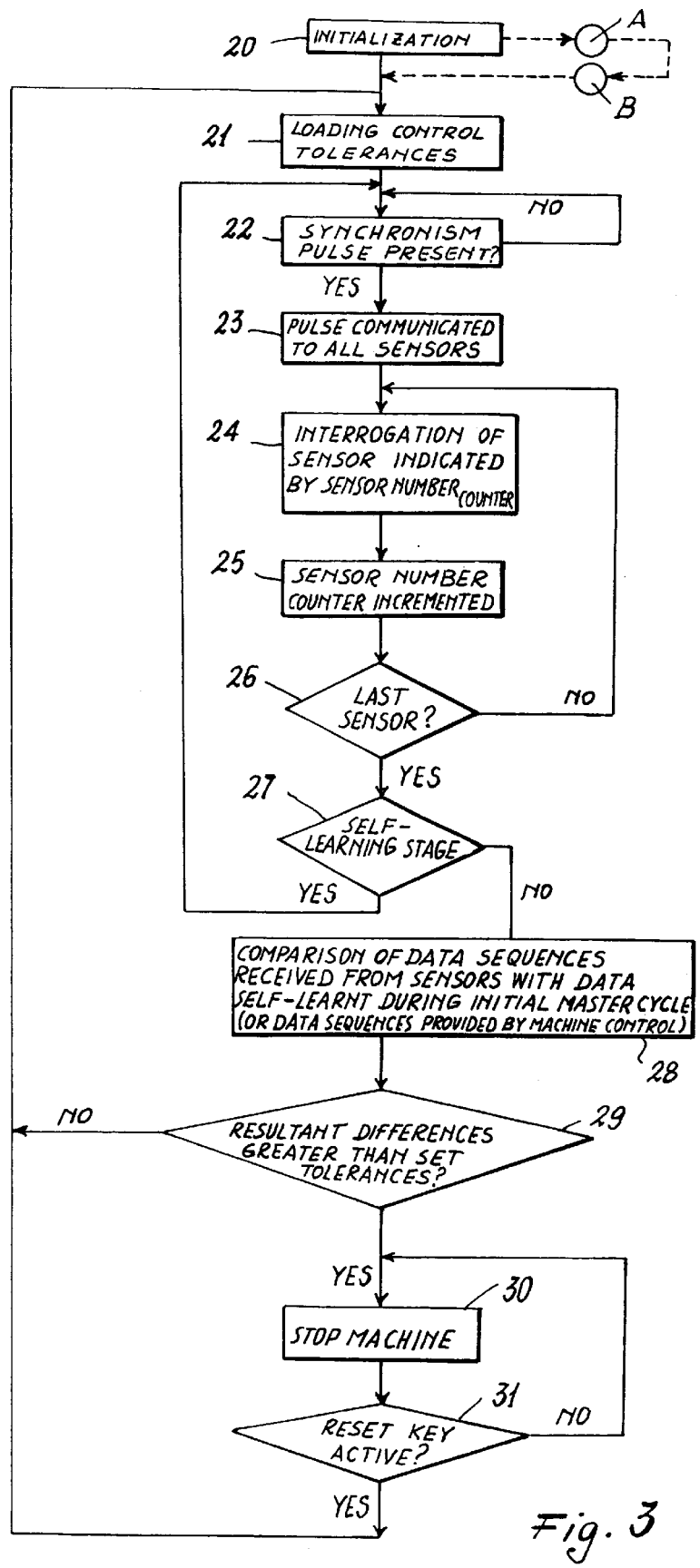
FIG. 3 is a block scheme showing the main steps of the method according to the invention.

With reference to FIGS. 3 and 4, the control of the device according to the invention comprises a first step or block 20 (FIG. 3) of initialization of the unit 5 (for example of microprocessor type) in which this latter is set for its operation and in known manner executes the necessary self-diagnosis checks on the device. The unit 5 then memorizes (step or block 21 of FIG. 3) the operating parameters and/or tolerances, which are suitably fed into it by an operator (in known manner).

When this has been done, the unit 5 waits to receive the first synchronism signal or pulse $V_A$ (step or block 22 of FIG. 3). When this arrives (with commencement of the production or working of an article), the unit feeds through each serial line of communication 10 a command recognizable by all the sensors and indicative of the arrival of the synchronism pulse (block or step 23). This sets all the sensors to receive from the central unit the identification codes (fed sequentially) for each of them. These codes (different for each sensor) are fed to all the sensors (blocks 24 and 25) which, on recognizing their own, feed (again sequentially) their own "response" to the unit 5. This response or response signal indicates the state of movement/stoppage and/or tension and/or speed of the yarn 2 with which each sensor cooperates. This communication provided by all the sensors to the unit 5 enables this latter to acquire all data relative to those yarn conditions which have arisen since the previous communication or synchronism pulse. More specifically, between one synchronism signal $V_A$ and the next, each sensor senses everything which happens regarding the yarn 2 with which it cooperates. For example, it senses if the yarn is moving, its tension and its speed. These data are memorized in the unit 14. If this latter is a simple flip-flop and if the sensor 5 is able only to sense movement of the yarn 2, each of these movements results in setting of the unit 14, which attains the logic state 1. When the control unit 5 feeds the code of said sensor 4 along the serial line 10, this code reaches the flip-flop, to reset it (to logic state 0). Hence the unit 5, in sensing that the logic state prior to the interrogation was 1, also senses that between the two successive pulses $V_A$ the yarn monitored by that particular sensor 4 has moved. If the sensor 4 also possesses the counter 15, the unit 5 is also able to know for how much time said yarn has moved, by reading the data memorized by said counter.

The codes are fed along the serial line or lines 10 sequentially as stated, while at the same time incrementing a counter for the number of sensors interrogated (block 25). When this number reaches the memorized maximum number of sensors connected to the unit 5, the machine 1 has substantially completed one cycle, extending between two successive synchronism pulses $V_A$, in the production or working stage of the article under control (block 26). These operations are repeated until the production or working stage of the article under control has ended.

Assuming that the unit 5 is in the process of self-learning the production, after an operator has checked that the production of an article has been correctly effected the unit 5 is informed (block 27) in known manner (for example by an appropriate signal fed to it by pressing a suitable key, not shown) that the production stage which has just ended is to be repeated for the subsequent production stages. During these latter, the signals obtained by the sensors 4 and already memorized must therefore be repeated with reference to the yarn signals which reach the unit 5. Consequently, when self-learning is complete, the unit 5 repeats the operations of blocks 22 to 26 and then executes the operation of block 28 in which it compares the multitude of data received from the sensors with the corresponding data (for example, corresponding to the yarn movement sequences) obtained during the initial self-learning master cycle. During this comparison, the unit 5 checks (block 29) whether differences exist between the obtained signals and the se t tolerances, and if these differences exceed a particular preset value it halts the machine (block 30), which can be restarted only by pressing a reset key (block 31), which is done after the operator has examined the machine with an eye to restoring its correct operation (for example checking why a particular yarn did not move or why it moved with excessive speed).

Pressing the reset key causes the unit to repeat the operations from block 21.

If the control unit does not undergo a self-learning cycle but instead is suitably programmed to effect the operational controls on the machine 1 before it is activated for the first time, the step or block 27 does not exist, and the procedure passes directly from step 26 to step 28 in which the unit compares the values obtained by the sensors with those memorized, using appropriate control algorithms.

The method of FIG. 3 is implemented after each sensor has been given its own identification code. In this manner it is possible to sequentially interrogate the sensors such that only that having the code fed by the unit 5 along the serial line responds to said unit. The presence of the identification code is necessary to be able to control the operation of the machine 1 in which the sensors 4 are connected serially to the control unit. Vice versa the aforedescribed control method is the necessary consequence of the method by which the sensors are serially connected to said unit.

The identification code can be assigned to each sensor via a suitable interface (keys) present on each of them, by suitably designing the electrical/electronic circuitry of each sensor, or can be assigned to them directly by the unit 5, as shown in FIG. 4. This figure shows a sequence of operations which can be effected by the unit 5 immediately after its initialization (block 20 of FIG. 3) and before the step represented by block 21 of FIG. 3. By means of these operations the unit 5 assigns codes to each sensor 4 automatically or semi-automatically.

More specifically, after its initialization, the unit assigns identification codes to the sensors 4 (block 35, FIG. 4), either automatically or by keying-in by an operator. It then feeds a signal along the serial line or lines, resulting in resetting of all said sensors (for example of their flip-flops 14), as indicated by the block 36. The sensors become set to receive the identification codes. When all the sensors have been reset (block 37), the unit 5 feeds along each serial line a first signal corresponding to a first identification code. This signal reaches all the sensors connected to said serial line but only one sensor accepts said code. This can occur automatically (for example by moving the yarn 2 monitored by this sensor) or by pressing a suitable acceptance key (provided on each sensor) by the operator. Following this acceptance of the code, the sensor 4 feeds an assigning-occurred signal to the unit 5. On receiving this, the unit feeds a second signal corresponding to a second identification code, which is then received by all the sensors connected to the serial line, only one of these accepting this code in the manner heretofore described in relation to the first sensor, then informing the control unit 5 that acceptance has occurred. This latter unit repeats said operations (block 38) a number of times equal to the number of sensors and until all have been set with their own identification code (block 39, FIG. 4). After performing these operations, the unit 5 executes the already described step indicated by 21 in FIG. 3.

By virtue of the device according to the invention and the described method, the number of electrical connection cables between the sensors 4 and the control unit 5 is reduced (even to merely a single serial line), while still achieving excellent control of the textile machine operation. This control is consequently achieved, summarizing the aforegoing description, in the following manner.

a) On receiving a synchronism signal $V_A$ from the machine 1, the control unit sequentially interrogates the various yarn sensors associated with the machine, in order to know the state of the yarns monitored by them. This interrogation is achieved by feeding a sequence of identification codes for each sensor along at least one serial connection line 10 between the sensors and the unit 5;

b) each sensor, having recognized its own code, "responds" to the unit 5 by feeding it (again along said serial line) with a signal corresponding to a state of feed of the yarn monitored by that sensor; this state can be that of movement or stoppage of the yarn, its tension, its speed of movement or another characteristic useful for monitoring it s feed to the textile machine;

c) on receiving the response signals from each sensor 4, the unit 5 can act on the machine 1 to halt it if one of these signals does not correspond to a signal memorized in the unit 5. This memorized signal can be a signal obtained during the production or working of a master product in executing a known self-learning method, or a signal memorized by the unit 5 after feeding into it a suitable control algorithm for the machine 1. Each sensor 4 senses an d memorizes each state of feed of the yarn between two successive yarn pulses, and feeds a corresponding electrical signal to the unit 5 only when it is interrogated. If the signal obtained (which if the sensor also possesses a counter is also representative of the duration of the presence of a certain state of the yarn between the two successive pulses) does not correspond to that memorized in the unit 5, it halts the textile machine.

Said method provides (indirect) excellent control of the quality of the product or of the work in hand at each moment during the of the machine 1.

One embodiment of the invention has been described. Others are however possible (such as one comprising only part of the sensors 4 provided with an identification code and connected via one or more serial lines 10 to the unit 5 or via parallel communication lines along which signals relative to data obtained by the sensors and to identification codes are fed sequentially or simultaneously), while remaining within the scope of the present document.

I claim:

1. A device for monitoring the feed of a plurality of yarns to a textile machine comprising sensor means cooperating with each of said yarns, said sensors means including 4 sensors, said sensors being arranged to sense the state of feed of said yarns and in particular their movement or stoppage, their tension and the speed at which they are fed to said machine, said sensors being connected to a control unit which, on the basis of the signals generated by said sensors controls the operation of the latter, characterised in that at least part of said sensors have their own identification code and wherein the control unit, on the basis of a periodic reference signal $(V_A)$ which is a function of the operating position of the textile machine, is structured and arranged to interrogate said sensors individually based on each of their identification codes and thereby receive from said sensors the data relative to the state of feed of the yarns monitored by said sensors.

2. A device as claimed in claim 1, characterised in that the sensor means (4) are provided with memorizing means (14) able to memorize the data relating to the state of feed of the yarns (2) with which said sensors cooperate, said data being read by the control unit (5) when this sequentially enters into communication with said sensor (4) via their identification code.

3. A device as claimed in claim 2, characterised in that the memorizing means are a flip-flop (14).

4. A device as claimed in claim 1, characterised in that the sensor means (4) comprise counter means (15) able to measure the duration of the state of feed of the corresponding yarn monitored by said sensors, the data obtained by said counter means (15) being read by the control unit (5) when this enters into communication with said sensors (4) via their identification code.

5. The device of claim 1, wherein said sensors are connected to said control unit by a single serial communication line and said control unit is structured and arranged to interrogate said sensors and to receive said data from said sensors via said single serial communication line.

6. A device as claimed in claim 1, characterised in that the sensor means (4) are connected to the control unit (5) via at least on e serial communication line which comprises at least one communication wire.

7. A device as claimed in claim 1, characterised in that the sensor means (4) are connected to the control unit (5) via parallel communication lines.

8. A method for controlling the device claimed in claim 1 and for monitoring the feed of yarns (2) to a textile machine (1), said device comprising sensor means (4) associated with said yarns (2) and a control unit (5) for the operation of said machine (I) and to which said sensor (4) are connected, characterised in that at least part of said sensor comprises the sequential interrogation of said sensor means (4) by the control unit (5), said sequential interrogation being only operated when the control unit receives a reference signal $(V_A)$ from the textile machine (1) which is a function of the operating position of the latter, said unit (5) receiving sequentially from all said sensor (4) the data concerning the state of feed of the yarn (2) with which the sensor cooperates, and monitored after a former interrogation or the first operation of the machine (1), said data from all the sensors (4) being processed by said control unit (5) until it receives a further reference signal ($V_A$), the unit (5) modifying or interrupting operation of the textile machine when there is a difference between the data obtained by at least one of said sensor means (4) and the data memorized by said unit (5) relating to said means (4).

9. A method as claimed in claim 7, characterised in that the sequential interrogation of all the sensor means (4) is achieved by the control unit (5) by sending to said sensors (4) a sequence of identification codes, the sensor means (4) replying to said interrogation when they recognize their own code.

10. A method as claimed in claim 7, characterised in that, during a stage of production or working of a master product, unit (5) comprises self-learning of the data relating to the state of feed of the yarns (2), said data being memorized by the control unit (5) after checking the quality of said product, and then being compared with the data obtained by the sensor means (4) during a subsequent production or working stage and fed to said unit (5) by each sensor after this has determined that the identification code which has reached all the sensors connected to said serial line from said unit (5) corresponds to its own code.

11. A method as claimed in claim 7, characterised by comprising the memorizing in the control unit (5) of data corresponding to the various production or working stages of an article, said memorized data then being compared with the data obtained by the sensor means (4) during a subsequent production or working stage and fed to said unit (5) by each sensor after this has determined that the identification code which has reached all the sensors connected to said serial line from said unit (5) corresponds to its own code.

12. A method as claimed in claim 7, characterised in that each sensor (4) senses and memorizes the duration of the data relating to the state of feed of the yarn (2) with which each sensor cooperates, said duration information then being fed to the control unit (5).

13. A method as claimed in claim 12, characterised in that each sensor (4) senses and memorizes the data relating to the state of feed of the yarn (2) with which each sensor cooperates and the duration of this information either during two successive interrogations by the control unit (5) or in the interval between two successive synchronism signals ($V_A$) reaching said unit (5) from the textile machine (1).

14. A method as claimed in claim 7, characterised in that sensor means comprises a stage of automatic assigning of the identification codes to each sensor (4).

15. A method as claimed in claim 13 for automatic assigning of the identification codes to each sensor, characterised in that the control unit (5) sequentially feeds all the sensor means (4) with a plurality of signals corresponding to the identification code to be assigned to the sensor means (4), each of said code being accepted by only one sensor (4) which transmits an assigning-occurred signal to the unit (5).

16. A method as claimed in claim 14, characterised in that each sensor (4) accepts the identification code automatically.

17. A method as claimed in claim 15, characterised in that the acceptance of its own identification code by the sensor (4) is obtained by moving the yarn (2) monitored by said sensor (4).

18. A method as claimed in claim 16, characterised in that the control unit (5) feeds the sensor means (4) with a resetting signal before transmitting the plurality of signals corresponding to the identification codes.

19. A method for controlling and monitoring the feed of yarns to a textile machine wherein the yarns cooperate with respective sensors which are connected to a control unit, comprising:

assigning each of the sensors a respective identification code, sending a synchronism signal ($V_A$) to the control unit, the signal being a function of an operating position of the machine, upon receiving the synchronism signal, interrogating the sensor means cooperating with respective yarns by feeding from the control unit individual identification codes which correspond to each sensor along at least one communication path, upon recognizing its own respective identification code, sending a signal from each respective sensor to the control unit comprising data corresponding to the state of feed of the yarn monitored by that sensor, processing the data received from the sensors in the control unit until the control unit receives a further reference signal ($V_A$), and modifying or interrupting operation of the textile machine by sending signals from the control unit to the textile machine when there is a difference between the data obtained by at least one of the sensors and data memorized by the control unit relating to the sensors.

* * * * *